Nov. 1, 1932.  J. J. MORRIS  1,886,294
FRICTION CLUTCH
Filed Sept. 4, 1928  2 Sheets-Sheet 1

Witness
Milton Lenoir

Inventor.
James J. Morris
By Brown, Jackson, Boettcher
Dienner
Attorneys

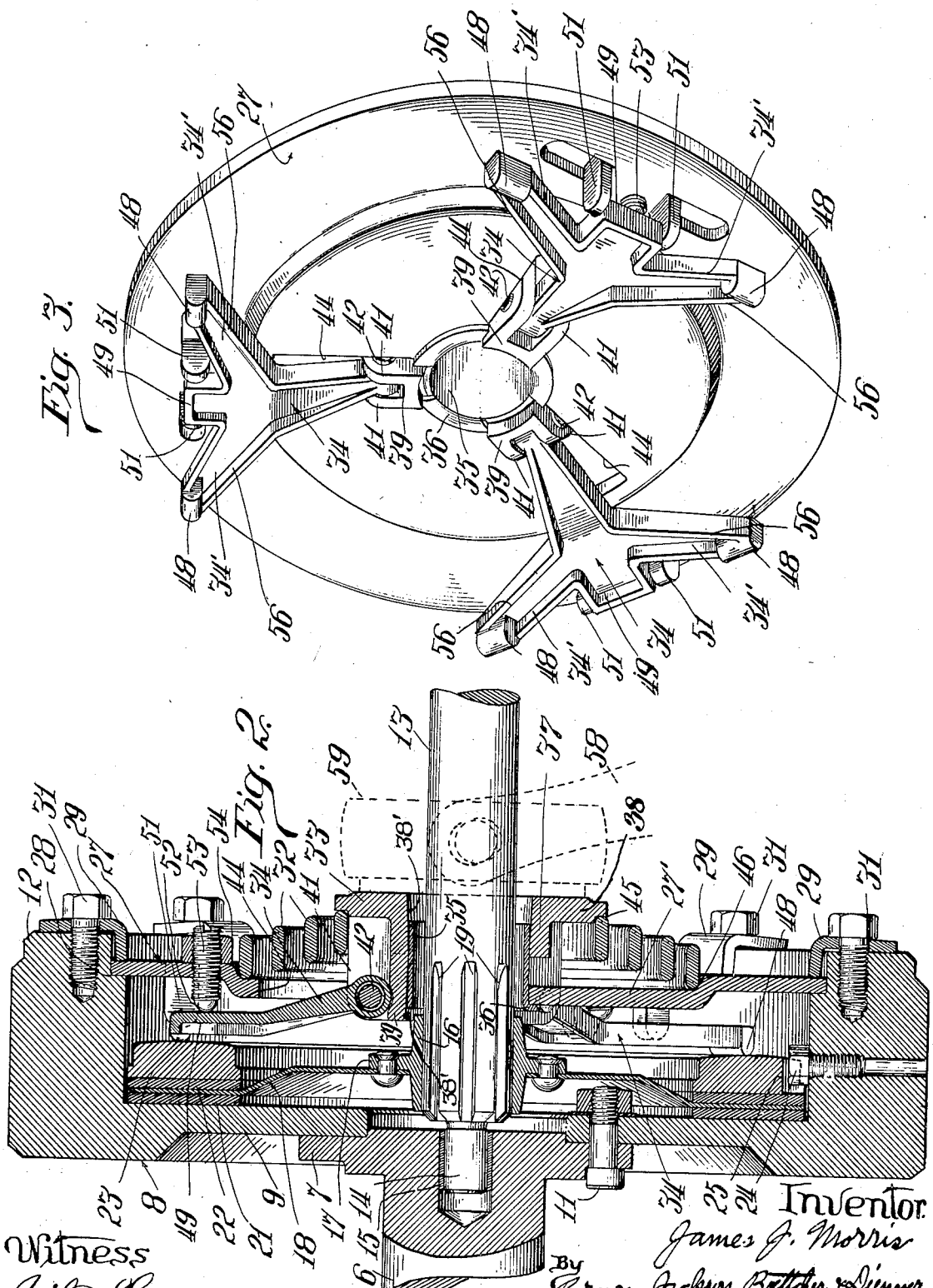

Patented Nov. 1, 1932

1,886,294

UNITED STATES PATENT OFFICE

JAMES J. MORRIS, OF CHICAGO, ILLINOIS

FRICTION CLUTCH

Application filed September 4, 1928. Serial No. 303,805.

The present invention relates to friction clutches, being directed to a construction of clutch designed primarily for automobiles, although it will be understood that the fundamental features of the invention are also capable of embodiment in friction clutches for other purposes.

The invention pertains to that type of friction clutch wherein the pressure of the clutch spring is transmitted to the frictional clutch surfaces through a series of pressure multiplying levers embodied in the clutch structure. These levers are usually arranged in angularly spaced relation within the clutch and are arranged to transmit the spring pressure to a thrust ring which in turn transmits said pressure to the frictional driving surfaces of the clutch. One of the objects of the invention is to improve upon this general type of clutch by increasing the number of points of contact through which the levers transmit their pressure to the thrust ring, so that the spring pressure is uniformly distributed over a multiplicity of points on the thrust ring, tending to facilitate axial shifting of the latter and holding the same against cocking or twisting relative to the frictional surfaces.

Such increased number of pressure transmitting points of contact between the levers and the thrust ring is obtained without adding to the number of levers or otherwise increasing the complexity of the structure by employing a certain novel form of lever which establishes a plurality of spaced points of contact with the thrust ring.

In this regard another object of the invention is to provide an improved mounting for each of such levers so that the lever can rock laterally as well as longitudinally in order that the application of spring pressure to the thrust ring will be uniformly distributed between the different thrusting points of the lever.

Another object of the invention is to provide an improved method of adjusting the clutch to compensate for wear of the frictional surfaces. Such adjustment is obtained by screwing the fulcrum points of the levers inwardly or outwardly, and inasmuch as these fulcrum points are disposed intermediate the ends of the levers, such shifting of the fulcrums shifts the outer ends of the levers towards or from the thrust ring. These fulcrums preferably have a point contact with their respective levers so that the levers can rock transversely, relatively thereto, as above described.

In this regard, another object of the invention is to provide improved and simplified guide means for holding the levers properly centered with respect to their fulcrums, so that the levers cannot become angularly displaced from proper contact with the fulcrums.

Another object of the invention is to provide a construction of clutch in which the machining and assembly costs have been reduced to a minimum so that the clutch can be manufactured at a lower cost than prior constructions of similar clutches.

Still another object of the invention is to provide a construction of clutch which is of compact dimension, particularly in its axial length. Aside from the obvious advantage of reducing the size of the clutch housing, the desirability of compact dimensions in such a clutch resides in the fact that the clutch can thus be substituted for other types of clutches theretofore employed in a standard design of clutch housing, irrespective of the size of the prior clutch, this feature being an important factor in enabling a parts manufacturer to sell the clutch to different automobile manufacturers.

Other objects and advantages of the invention will appear in the following description of a preferred embodiment thereof.

In the accompanying drawings illustrating such embodiment:

Fig. 2 is an axial sectional view taken approximately on the plane of the line 2—2 of Fig. 1;

Fig. 3 is a perspective view looking at the inner side of the rear housing plate and illustrating the mounting of the pressure transmitting levers.

Figure 1:
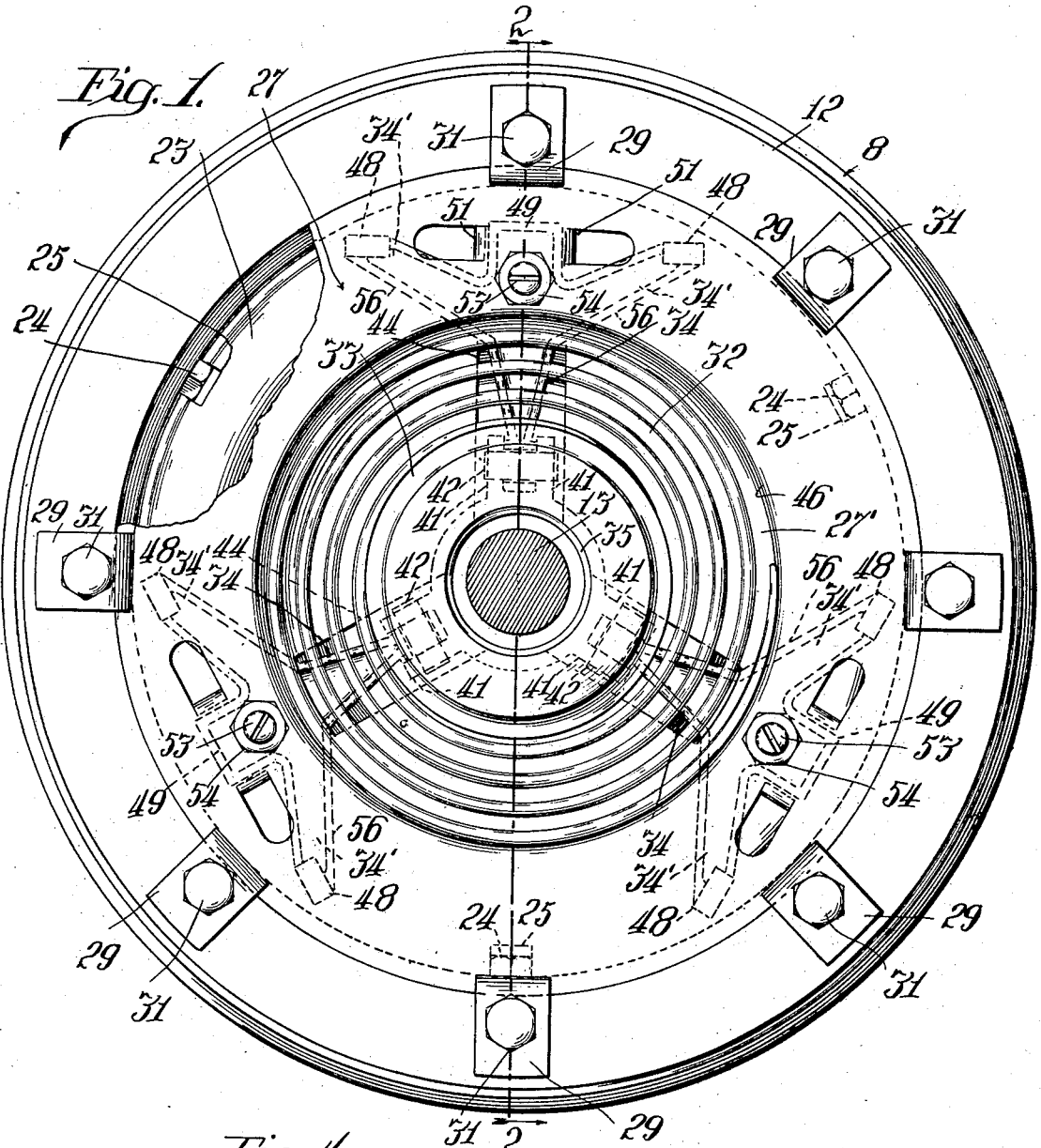
Fig. 1 is a rear end view of the clutch, partly in section and partly in elevation.

The clutch comprises a drive shaft 6, corresponding to the engine crank shaft in an automobile adaptation, from the rear end of which shaft extends a radial flange 7, (Fig. 2). The flywheel 8 has its main web 9 secured to the flange 7 by the bolts 11. The rim of the flywheel is formed with a rearwardly extending annular portion 12 which defines a substantially cylindrical chamber for housing the clutch parts.

The driven shaft 13 extends in axial alinement with the driving shaft 6 and is formed with a reduced forward end 14 which has bearing support in a bearing bushing 15 recessed into a bore in the end of the drive shaft 6. The driven element of the clutch is mounted on the shaft 13 and comprises a hub 16 having a radially extending flange 17 to which is riveted the clutch ring 18. The hub 16 is non-rotatably secured to the driven shaft 13 by inter-engaging splines or flutes 19 formed on the shaft and in the hub. The driven element 18 is driven from the flywheel or driving element 8 through the friction surfaces of two rings 21 and 22 composed of friction material, and disposed on opposite sides of the clutch disc 18. Pressure is applied to the frictional surfaces through a thrust ring 23 which bears against the rear side of the rear friction ring 22. Said thrust ring is free to have axial shifting movement within the outer annular portion 12 of the flywheel, but is compelled to rotate therewith through the provision of angularly spaced projections 24 extending inwardly from the annular portion 12 and engaging in notch-like recesses 25 in the periphery of the thrust ring.

If desired, the projections 24 may consist of the heads of bolts having their shank portions screwing outwardly in the flywheel annulus 12. It will be evident that pressure applied to the thrust ring 23 will compress the friction ring 21 between the flywheel and the clutch disc 18 and will also compress the friction ring 22 between the clutch disc and the thrust ring, thereby establishing a driving relation between the flywheel 8 and the clutch disc 18. Attention is directed to the fact that this clutch disc or ring 18 is constructed in the form of a sheet metal stamping. The latter has sufficient resiliency to permit the outer gripping portion thereof to flex forwardly or rearwardly as pressure is applied to or removed from the thrust ring 23, so that it is not necessary that the hub 16 have a sliding fit on the driven shaft 13, although such hub is preferably arranged for sliding movement. It will be observed that the inner portion of the clutch disc is cupped rearwardly to clear the ends of the bolts 11.

The rear side of the flywheel 8 is substantially closed by a plate 27, the peripheral edge of which seats in an annular groove 28 formed in the inner side of the flywheel rim 12. Said plate is rigidly secured to the flywheel by a series of angle-shaped clamping brackets 29 disposed at different points around the rear side of the flywheel. Each bracket is secured by a cap screw 31, which passes through an aperture in the bracket and taps into a threaded bore in the flywheel. Each bracket is so proportioned that the outer edge or corner has tilting contact with the rear face of the flywheel when the inwardly turned end of the bracket is bearing against the outer side of the plate 27, so that tension exerted on said bracket through the screw 31 will rigidly hold the plate against the inner end of the groove 28.

Figure 4:
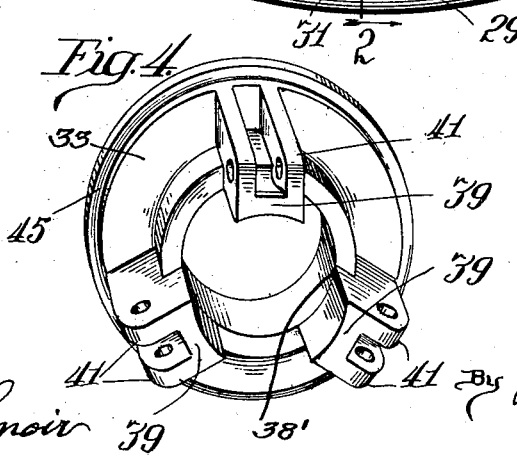
Fig. 4 is a perspective view of the clutch actuating collar viewed from the inner end.

The plate 27 supports the moving parts of the clutch actuating mechanism, consisting of the spring 32, shifting collar 33 and the levers 34 which are pivotally connected to the collar 33. The central portion of the plate 27 carries an axially extending guide sleeve 35 which is spaced from the driven shaft 13 and which serves as a bearing along which the clutch actuating sleeve or collar 33 has shifting movement. As shown in Figs. 2 and 3, the front end of the sleeve 35 has an outwardly turned flange 36 which is suitably secured to the front side of the plate 27, preferably by welding the two together. The clutch actuating collar 33 comprises a hub 37 having sliding engagement on the guide sleeve 35, and extending from the rear end of the hub is a radial flange 38. Referring to Fig. 4, it will be observed that at three equidistantly spaced points about the collar 33 there are formed forwardly extending arcuate portions 39, which extend through the inner side of the plate 27. The hub 37 together with the forwardly extending portions 39 may have a cylindrical inner bore for snug sliding engagement on the guide sleeve 35. However, as an alternative construction I propose forming such bore with a taper 38′ extending to each end of the collar from an intermediate point thereof, the high point between the two tapers 38′ affording a bearing surface relatively to which the collar can rock slightly in its shifting movement, thereby enabling the collar to adapt itself to inequalities of spring pressure without binding. Obviously, these reverse tapers may be formed on the guide sleeve 35, if desired. Extending radially outward from each side of the projections 39 are side walls or lugs 41 which define a U-shaped pocket in which is pivoted the associated lever 34. The pivot pin 42 on which the lever is mounted is extended through the two side walls 41. Referring to Figure 3, it will be seen that the plate 27 is provided with three radially extending slots 44 through which the projecting portions 39—41 of the clutch actuating collar extend. Said slots compel the collar to rotate concurrently with the plate 27 but permit axial sliding movement of the collar incident to the engaging and releasing of the clutch.

The joining flange 36 between the guide sleeve 35 and plate 27 is cut away in the plane of each slot 44.

The clutch spring 32 is of the spiral ribbon type and extends in compression between the radial flange 38 of the clutch collar 33 and the rear mounting plate 27. The inner convolution of the spring seats on and bears against a grooved seating surface 45 formed on the inner side of the flange 38. The outer convolution seats in and bears against an annular shoulder 46 formed in the rear surface of the plate 27. Such latter shoulder is formed by indenting or dishing the central portion 27' of the plate forwardly from the plane of the outer portion thereof. The pressure of the spring 32 tends constantly to thrust the clutch actuating collar 33 rearwardly for engaging the clutch.

As shown in Fig. 3, each lever 34 is of approximately T-shaped outline, comprising the outwardly extending arm or main portion which is pivoted to the clutch collar and comprising the two laterally extending arm portions 34'—34'. The ends of such laterally extending arms are formed with forwardly projecting thrust surfaces 48, which are rounded and which are adapted to bear against the rear side of the thrust ring 23. Located centrally between the two laterally extending arms is an outwardly projecting guide extension 49 formed as an integral part of the lever and adapted to hold the same on a radial line with respect to the plate 27. Such plate has two guide ears or lugs 51 punched out of the body of the plate and bent forwardly to embrace the opposite sides of the guide extension 49, the lugs having a relatively close fitting engagement therewith to accurately hold the lever against lateral movement. Each lever has a longitudinal rocking movement about a fulcrum 52 consisting of a rounded forward end on a screw 53 which threads in a tapped hole in the plate 27.

A lock nut 54 threads over said screw and abuts against the back of the plate 27, serving to hold the fulcrum screw 53 in any adjusted position. The fulcrum point 52 is located intermediate the ends of the lever, making the lever one of the first class, said fulcrum point being disposed in close proximity to the outer end of the lever, resulting in the outer lever arms being effective to transmit a large mechanical advantage to the thrust ring 23. As shown in Fig. 3, a reenforcing flange or rib 56 extends around the entire outer margin of the lever on the inner side thereof.

As the clutch actuating collar 33 is shifted forwardly and rearwardly the three levers 34 rock longitudinally about their fulcrums 52 for releasing or applying the spring pressure to the frictional driving surfaces through the thrust ring 23. With such rocking movement there is a slight radial movement of the outer portion of each lever, such being accommodated by the thrust points 48 sliding on the surface of the thrust ring and by the lever sliding on the ball-point fulcrum 52. By virtue of the T shape of each lever the pressure of the spring 32 is transmitted to the thrust ring 23 through six points of thrust contact 48, thereby obtaining a more uniform distribution of the spring pressure over the thrust ring. Each lever is capable of rocking laterally or transversely to a limited extent so that equal pressures will be transmitted through the two arms 34'—34'. Such lateral rocking can readily occur about the ball-point fulcrum 52, the guide extension 49 being capable of rocking sufficiently between the guide lugs 51 for permitting such movement. Similarly the inner end of the lever has sufficient play at its pivotal mounting 42 to permit of this slight lateral rocking movement.

When the frictional surfaces associated with the driving and driven clutch elements wear, adjustment may be made to compensate for this wear by releasing the lock nuts 54 and screwing the fulcrum screws 53 inwardly to shift the fulcrum points 52 closer to the thrust ring 23.

It will be observed that the entire assembly consisting of the spring 32, clutch collar 33 and levers 34, is mounted on the plate 27, and hence this assembly can be readily removed for inspection or repair. In replacing this unit the pressure which can be transmitted to the plate 27 through the cap screws 31 and angle brackets 29, enables the pressure of the spring 32 to be overcome for properly positioning the unit without laborious effort. The plate 27 is constructed as a stamping, and similarly the brackets 29 can consist of stampings, thereby minimizing the cost of construction. By having the levers 34 extend back through the slots 44 in making pivotal connection to the collar 33, and by dishing the central portion of the plate 27 forwardly to receive the outer convolution of the spring 32, the entire clutch is made of relatively short axial dimension. This feature enables the clutch to be substituted for practically any standard clutch without necessitating any change in design or dimensions of the clutch housing. The clutch releasing fork is indicated at 58, any suitable type of thrust collar or thrust bearing 59 being interposed between the fork and the clutch actuating collar 33. Any suitable spacing means may be employed or the thrust bearing may be proportioned so as properly to relate the stroke of the clutch releasing fork 58 to the clutch releasing motion of the levers 34.

I claim:

1. In a friction clutch, the combination of a driving element, a driven element, a thrust member adapted to establish driving engagement between said elements, a spring, a clutch actuating collar responsive to said spring, levers actuated by said collar for transmitting spring pressure to said thrust member, and fulcrums for said levers intermediate the effective ends thereof, and permitting transverse rocking movement of said levers, each of said levers comprising laterally spaced members applying spring pressure to said thrust member at laterally spaced points.

2. In a friction clutch, the combination of a driving element, a driven element, a thrust member adapted to establish driving engagement between said elements, a spring, a clutch actuating collar responsive to said spring and normally tending to move away from said thrust member, levers of approximately T shape actuated by said collar and having laterally extending arms arranged to transmit spring pressure to said thrust member at laterally spaced points, and fulcrums for said levers intermediate the effective ends thereof, and permitting transverse rocking movement of said levers.

3. In a friction clutch, the combination of a driving element, a driven element, a thrust member adapted to establish driving engagement between said elements, a spring pressed clutch actuating collar normally tending to move away from said thrust member, levers of the first class actuated by said collar for transmitting spring pressure to said thrust member, and means mounting said lever for longitudinal and transverse rocking movement.

4. In a friction clutch, the combination of a driving element, a driven element, a thrust member adapted to establish driving engagement between said elements, a spring, a clutch actuating collar responsive to said spring, levers actuated by said collar and having laterally extending arms for transmitting spring pressure to said thrust member, fulcrum members disposed intermediate the ends of said levers and relative to which each lever has longitudinal and transverse rocking movement, and a pivotal connection for the inner end of each lever comprising a pivot pin engaging in the lever and in said clutch actuating collar, said pivotal connection permitting transverse rocking movement of the lever.

5. In a friction clutch, the combination of a driving element, a driven element, a thrust member adapted to establish driving engagement between said elements, a spring, a clutch actuating collar responsive to said spring, levers actuated by said collar, each of said levers comprising means for transmitting the pressure of said spring to said thrust member at a plurality of spaced points, a plate carried by said driving element, and fulcrum members having adjustable threaded mounting in said plate and having a point contact with each of said levers whereby the latter can rock longitudinally and laterally relative to said fulcrum members.

6. In a friction clutch, the combination of a flywheel, a driven element, a thrust member adapted to establish driving engagement between said flywheel and said driven element, a spring, a clutch actuating collar responsive to said spring, T-shaped levers having their inner ends pivotally connected with said collar and having their laterally extending arms contacting with said thrust member at laterally spaced points, a plate carried by said flywheel, and fulcrum members having adjustable threaded mounting in said plate and establishing a fulcrum point for said levers intermediate their ends and relative to which said levers can rock longitudinally and laterally.

7. In a friction clutch, the combination of driving and driven elements, a thrust member adapted to establish driving engagement between said elements, a plate carried by said driving element, an annular guide member carried by said plate, a clutch actuating collar slidably mounted upon the outer surface of said annular guide member, a spring interposed between the outer side of said plate and said clutch actuating collar, and levers disposed on the inner side of said plate and pivotally connected with said collar and operative to transmit pressure to said thrust member.

8. In a friction clutch, the combination of driving and driven elements, a thrust member adapted to establish driving engagement between said elements, a plate mounted on said driving element, said plate having openings therein, a guide sleeve carried by said plate, a clutch actuating collar slidably mounted on the outer surface of said guide sleeve, a spring interposed between the outer side of said plate and said collar, and levers disposed on the inner side of said plate and having their outer ends bearing against said thrust member, the inner ends of said levers extending through the openings in said plate and being pivotally connected with said clutch actuating collar.

9. In a friction clutch, the combination of driving and driven elements, a thrust member adapted to establish driving engagement between said elements, a plate carried by said driving element, a clutch actuating collar, a spring interposed between the outer side of said plate and said collar, said collar comprising members extending through spaced openings in said plate whereby said collar is positively rotated by said plate, and levers pivotally connected with said latter members and arranged to transmit spring pressure to said thrust member, the inner ends of said levers extending through said plate, and the outer ends of said levers being fulcrumed at the inner side of said plate.

10. In a friction clutch, the combination of driving and driven elements, a thrust member adapted to establish driving engagement between said elements, a plate carried by said driving element and having openings therein, a clutch actuating collar comprising pivot members extending through the openings in said plate, said clutch actuating collar being positively rotated by said plate, a spring interposed between the outer side of said plate and said clutch actuating collar, and levers disposed on the inner side of said plate and operatively connected with said pivot members to transmit spring pressure to said thrust member.

11. In a friction clutch, the combination of driving and driven elements, a thrust member adapted to establish driving engagement between said elements, a plate carried by said driving element, a clutch actuating collar comprising inwardly extending lugs, a spring interposed between the outer side of said plate and said clutch actuating collar, levers disposed on the inner side of said plate pivot connections between the inner ends of said levers and said lugs, and fulcrums for said levers on the inner side of said plate and arranged whereby said levers transmit the pressure of said spring to said thrust member, said fulcrums and pivot connections permitting transverse rocking movement of said levers.

12. In a friction clutch, the combination of driving and driven elements, a thrust member adapted to establish driving engagement between said elements, a plate carried by said driving element, said plate having radially extending slots therein, a clutch actuating collar, a spring interposed between the outer side of said plate and said collar, said collar comprising U-shaped pivot portions extending inwardly through the slots in said plate, levers disposed on the inner side of said plate and having their inner ends pivotally mounted between the sides of said U-shaped pivot portions, the outer ends of said levers bearing against said thrust member, and adjustable fulcrum members carried by said plate and contacting with said levers intermediate their ends.

13. In a friction clutch, the combination of driving and driven elements, a thrust member adapted to establish driving engagement between said elements, a plate carried by said driving element, a clutch actuating collar, a spring acting on said collar, levers having their inner ends operatively connected with said collar and having outer portions arranged to bear on said thrust member, fulcrum members carried by said plate for each of said levers and relative to which said levers can rock longitudinally and laterally, and cooperating guide means between said plate and said levers for holding the outer portions of said levers against angular shifting relative to said fulcrum members.

14. In a friction clutch, the combination of driving and driven elements, a thrust member adapted to establish driving engagement between said elements, a plate carried by said driving element, a clutch actuating collar slidable relatively to said plate, a spring acting on said collar, T-shaped levers having their inner ends pivotally connected with said collar and having their outer laterally extending arms transmitting spring pressure to said thrust member, screws threading in said plate in rear of each of said levers, each of said screws comprising a ball point affording a fulcrum point for the lever relatively to which said lever can rock longitudinally and laterally, each of said levers comprising a guide extension, and guide lugs punched from said plate and embracing the opposite sides of each of said guide extensions.

15. In a friction clutch, the combination of driving and driven elements, a thrust member adapted to establish driving engagement between said elements, a plate carried by said driving element, said plate having its central portion indented inwardly to form an internal annular shoulder on the outer side of said plate, said central portion having radially extending slots therein, a clutch actuating collar, a compression spring interposed between said internal annular shoulder and said collar, said collar comprising pivot portions extending inwardly through said radial slots, levers pivotally connected at their inner ends to said pivot portions and having their outer ends bearing against said thrust member, and fulcrums for said levers carried by said plate.

16. In a friction clutch, the combination of driving and driven elements, an annular thrust member adapted to establish driving engagement between said elements, a clutch actuating collar, spring means having one end reacting inwardly against said driving element and having its other end normally pressing said collar outwardly in a direction away from said clutch, levers operatively connected with said collar and arranged to have their inner ends pulled outwardly by said collar to transmit the spring pressure to said thrust member axially thereof, and a guide member for said collar having a bearing surface along which the bearing surface of said collar is adapted to slide axially of the clutch, one of said bearing surfaces being tapered to permit rocking movement of said collar relatively to said guide surface.

17. In a friction clutch, the combination of a driving element, a driven element, a thrust member adapted to establish driving engagement between said elements, a plate carried by said driving element, a clutch actuating collar, a spiral spring having its outer convolution bearing against said plate and having its inner convolution bearing against said collar and tending normally to thrust said collar outwardly in a direction away from said thrust member, T-shaped levers having bearing surfaces on their laterally extending arms adapted to bear against said thrust member at laterally spaced points, fulcrum members carried by said plate and disposed intermediate the ends of said levers, and connections between the inner ends of said levers and said collar, said fulcrums and said latter connections permitting transverse rocking movement of said levers.

18. In a friction clutch, the combination of driving and driven elements, a thrust member adapted to establish driving engagement between said elements, a spring pressed clutch actuating collar, levers operatively connected with said collar and arranged to transmit the spring pressure to said thrust member, and a guide member over which said collar is adapted to slide, the bore of said collar being tapered from an intermediate point outwardly toward opposite ends of the collar to permit rocking movement of said collar relatively to said guide member.

In witness whereof I hereunto subscribe my name this 22nd day of May, 1928.

JAMES J. MORRIS.